United States Patent [19]

Suetoshi et al.

[11] 4,325,772
[45] Apr. 20, 1982

[54] METHOD OF INTERNALLY LINING AN INSTALLED PIPE

[75] Inventors: Tetsui Suetoshi, Kawachinagano; Munetaka Kinugasa, Nishinomiya; Koichi Hosoya, Ashiya; Mitsuo Yamamoto, Minamikawachigun, all of Japan

[73] Assignee: Osaka Gas Kabushiki Kaisha, Osaka, Japan

[21] Appl. No.: 209,919

[22] Filed: Nov. 24, 1980

Related U.S. Application Data

[63] Continuation-in-part of Ser. No. 932,981, Aug. 9, 1978, abandoned.

[30] Foreign Application Priority Data

Aug. 18, 1977 [JP]  Japan .................................. 52-99898
Nov. 30, 1977 [JP]  Japan .................................. 52-144775

[51] Int. Cl.³ ............................................. B29C 27/16
[52] U.S. Cl. ..................................... 156/294; 138/97; 156/94; 156/295
[58] Field of Search .................. 138/97, 141; 156/83, 156/94, 145, 147, 156, 165, 199, 287, 294, 295; 220/403, 404; 264/95, 269, 314; 285/45, 53, 55; 405/150

[56]  References Cited

U.S. PATENT DOCUMENTS 3,135,640  6/1964  Kepka et al. .................. 156/287 X
3,230,129  1/1966  Kelly ................................... 156/287
4,064,211  12/1977  Wood .............................. 156/287 X

FOREIGN PATENT DOCUMENTS 1039836  8/1966  United Kingdom .

Primary Examiner—Edward C. Kimlin
Assistant Examiner—Robert A. Dawson
Attorney, Agent, or Firm—Edwin E. Greigg

[57]  ABSTRACT

A method of internally lining an installed pipe, which may be used for various types of pipelines such as those for transmitting town gas, natural gas, petroleum, and water. According to the invention, a flexible liner tube is placed inside an installed pipe, and then a liquid adhesive agent is introduced between the pipe and the tube. In this condition, an object is passed through the tube whereby the liquid adhesive agent acts to make the tube adhere to the interior wall of the pipe.

9 Claims, 14 Drawing Figures

METHOD OF INTERNALLY LINING AN INSTALLED PIPE

This application is a continuation-in-part of Application Ser. No. 932,981 filed Aug. 9, 1978 and now abandoned.

CROSS REFERENCE TO NONANTICIPATIVE PRIOR ART

The invention is an improvement and departure over the prior art of applicants parent application including:

| British Patent | 1,039,836 | August 1966, |
|---|---|---|
| U.S. Pat. Nos. | | |
| Kepka | 3,135,640 | June 1964 |
| Kelly | 3,230,129 | January 1966 |
| Wood | 4,064,211 | December 1977 |

BACKGROUND OF THE INVENTION

This invention relates to a method of lining the interior walls of various installed pipes such as those for transmitting town gas, natural gas, petroleum, and water.

Typical examples of the conventional methods include the following:

(1) A method which involves insertion of a hard pipe such as a polyethylene pipe into a pipe to be treated.

(2) A method according to which a flexible tube of a film material provided in part with an adhesive agent is inserted into a pipe to be treated and then made to expand therein by applying or reducing pressure.

(3) A method according to which a liquid lining material is introduced into a pipe to be treated and then an object is passed through the pipe, making the lining material adhere to the pipe interior. Any superfluous amount of the lining material is recovered.

In the (1) method in which a pipe of a hard material is inserted into a pipe to be treated, the hard pipe must have a diameter considerably smaller than the internal diameter of the pipe to be treated, which results in a reduced sectional dimension of the fluid passage. This method has a further disadvantage in that it is applicable only to straight pipe portions and not to an installed pipe which generally has many bends. The (2) method makes only part of the film tube adhere to the interior wall of the pipe. In case a crack, for example, is present in the pipe, water may enter through the crack from outside and proceed between the tube and the pipe where no adhesion has occurred. This causes the tube to come off the interior wall of the pipe, reducing the effective fluid passage dimension and thus the transmitting capacity of the pipe. Furthermore, this method is liable to tearing of the tube when caught by rust on the interior wall of the pipe, or by bend portions or joint portions of the pipe. In the (3) method, the lining material may not be applied over the whole periphery and length of the pipe. The liquid lining material is likely to move down on the interior wall of the pipe before it cures, which results in an uneven layer of lining.

One solution to the above disadvantage may be the method disclosed in United Kingdom Pat. No. 1,039,836. This method comprises placing in a pipe a flexible liner tube together with a delivery hose for supplying an adhesive agent, retracting the hose from the pipe interior while supplying the adhesive agent into the pipe through an opening at an extreme end of the hose, and then passing an object through the liner tube to thereby cause the tube to adhere to the pipe interior. As the liner tube is of a flexible material, it is adaptable to any suitable shape for insertion into the pipe, and such tube may be readily inserted into a pipe with many bend portions. After insertion of the tube into the pipe, an object is passed through the tube to cause its adhesion to the pipe wall, and this has an advantage of good adhesion over the pressure applying or reducing method.

However, the method of this British patent is not without problems. Since the liner tube and the adhesive supplying hose are inserted into the pipe together, not only is the inserting operation difficult but the hose and the tube may get entangled with each other. The entanglement may cause them to be twisted or damaged. The same problem could occur when the hose is wound up from the pipe while supplying the adhesive agent into the pipe. Particularly when winding up the hose, the hose is likely to entangle with the tube or get caught by the interior wall of the pipe. This means an irregular withdrawal speed of the hose opening and an uneven supply of the adhesive agent along the pipe. Such a situation will bring about poor bonding of the tube onto the pipe. These defects of the method of the British patent will become more notable the longer or more curved the pipe is.

Even if supplied uniformly along the pipe, the adhesive agent lies only in the lower portion of the pipe interior, in other words at the lower forward face of the object to be passed. Therefore, the advancing object can hardly assure a positive distribution of the adhesive agent over the inner periphery of the pipe, which is likely to result in poor adhesion of the liner tube.

Moreover, the method of this British patent involves winding up of the hose when supplying the adhesive agent, which renders the whole operation complicated and time-comsuming.

SUMMARY OF THE INVENTION

In view of the foregoing state of the art, the object of this invention is to provide for reliable treatment of a pipe in an installed disposition with a uniform lining over the entire interior thereof including bend portions to render the pipe erosion-resistant and leakproof.

A method of internally lining an installed pipe according to this invention comprises the steps of placing a flexible liner tube in the pipe with the liner tube extending between the ends of the pipe, introducing concentratedly a selected quantity of a liquid adhesive agent through one end of the pipe between the upper portion of the inner wall of the pipe and the upper portion of the surface of the liner tube, and placing an object in the liner tube and passing the object through the interior of the liner tube, with the adhesive agent constantly present substantially over an entire forward face of the object, from the one end to the other end of the pipe to expand the liner tube into overlying engagement with the inner wall of the pipe and to distribute the adhesive agent peripherally and longitudinally of the inner wall of the pipe to thereby cause the liner tube to adhere to the inner wall of the pipe.

In the above method, the liner tube alone is inserted into the pipe prior to introduction of the adhesive agent. Therefore, the tube insertion is carried out very smoothly and involves little possibility of the tube getting twisted or damaged. Then, after the tube has been inserted, a necessary or more amount of the adhesive agent is introduced at once at one end of the pipe, which is a very simple and quick operation and therefore allows a short hardening time of the adhesive agent. That is, the adhesive agent may be selected from a wide variety. The adhesive agent is introduced into a space between the upper inner surface of the pipe and the upper surface of the liner tube and the object placed in the tube is advanced therethrough with the adhesive agent constantly present substantially over an entire forward face of the object. This assures a wasteless distribution of the adhesive agent peripherally as well as longitudinally of the inner wall of the pipe, and thus a reliable adhesion with a minimum of the adhesive agent.

As noted above, it is important in working the present invention to constantly retain the adhesive agent substantially over the entire forward face of the object. For this purpose an adhesive agent of high viscosity may be employed. However, varied tests carried out by the inventors show that the adhesive agent having a very high viscosity impairs not only the efficiency of its introduction into the pipe but its distribution with the advance of the object, which results in an unsatisfactory adhesion of the tube to the inner wall of the pipe. The tests confirm that, if an adhesive agent of low viscosity is used and the object is moved at high speed in order to retain the adhesive agent substantially over the entire forward face of the object all the time, a very poor adhesion results when the object is driven at above a certain speed. Through their varied and extensive tests the inventors have found that a fairly good adhesion is obtained when the viscosity of the adhesive agent is in the range of 2,000 to 50,000 cp and the traveling speed of the object is in the range of 1 to 30 cm/sec. It has also been found that the resulting adhesion is particularly excellent when the viscosity is 5,000 to 30,000 cp and the speed is at 2 to 20 cm/sec. On the basis of these test results the viscosity of the adhesive agent and the velocity of the object may be selected and determined within the above ranges to assure a very reliable adhesion.

According to one preferred embodiment of the invention, the liner tube has a multi-layer construction comprising an outer first tube member and an inner second tube member, the first tube member being formed of a material highly permeable to the liquid adhesive agent and the second tube member being formed of a film of lining material. In such an arrangement where the first tube member covers the second tube member, the former serves as protector for the latter against damage at the time of insertion into the pipe. Further, since the first tube member is formed of a highly permeable material such as an unwoven material or a mesh material, it holds the liquid adhesive agent very well. This eliminates downward flow of the adhesive agent and assures a uniform lining over the entire interior wall of the pipe to a greater degree. The liquid adhesive agent permeates into the first tube member and cures therein forming a lining layer itself. This makes possible the formation of a thick layer of lining by providing a thick first tube member. Since the first tube member serves as reinforcement for the lining layer, the resulting interior lining is thick and strong, and may be formed easily and reliably. Particularly where the first tube member comprises a mesh or unwoven synthetic resin and the second tube member comprises a polymeric film, a very satisfactory result is obtained both in adhesion to the pipe interior and in resistance against the wearing action of fluid after the lining operation.

In this instance, the first and second tube members may be formed into a single piece by adhesion process prior to insertion into the pipe, which facilitates the insertion work and improves efficiency. Where the tube members are drawn into the pipe in two separate pieces, the leading portion particularly of the first tube member may stretch and the rearward portion get creased thereby resulting in a lining layer of uneven thickness longitudinally of the pipe. Such a possible inconvenience is positively eliminated by forming the first and second tube members into a single piece in advance. This advantage is particularly notable where the first tube member comprises a mesh material and the pipe is long or has many bends.

Other objects and advantages of the invention will be apparent from the following description.

BRIEF DESCRIPTION OF THE DRAWINGS

In the drawings illustrating a method of internally lining an installed pipe according to the invention.

DESCRIPTION OF THE PREFERRED EMBODIMENTS

Embodiments of this invention are described hereinafter with reference to the drawings.

Figure 1:
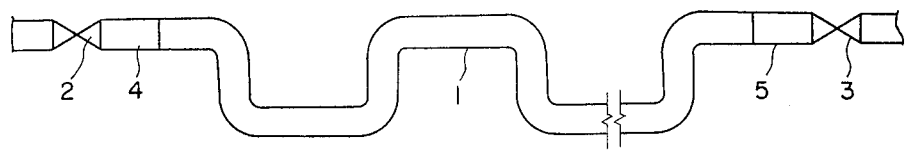
FIGS. 1, 2, 3, 4a, 5a, 6, 7 and 9 are diagrammatic views showing a lining treatment in sequence of progress.

FIG. 1 shows an underground pipe 1 having bend portions. The pipe 1 is dug out of the ground at positions corresponding to the ends of the range to be internally lined, and is closed at upstream and downstream sides of the dug out positions by means of valves 2, 3 provided or specially mounted for this purpose on the pipe 1. The fluid present in pipe 1 between valves 2, 3 is replaced with air, and dug out portions 4, 5 of the pipe 1 are cut or removed to open the ends. It will be understood that gas bags may be employed instead of the valves 2, 3.

Figure 2:
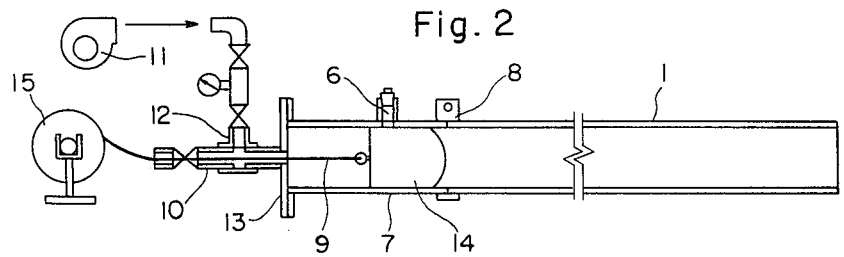

Referring to FIG. 2 next, a launcher 7 having an inlet port 6 for the liquid adhesive agent is coupled to one of the pipe openings by means of a band 8 which is the type comprising two semicircular straps, and a lid member 13 having a passage 10 for a wire 9 and a connection tube 12 for connection with a pressure device 11 is attached to the launcher 7. Prior to this, an object 14 engaging the wire 9 is mounted in the launcher 7. The pressure device 11 is actuated to send object 14 to the other pipe opening, whereby wire 9 is unwound from a reel 15 to reach the other opening.

Figure 3:
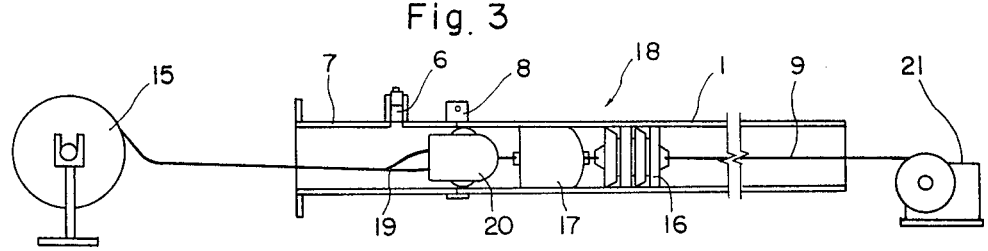

As shown in FIG. 3, the wire 9 is then connected to a pipe cleaning device 18 comprising a first cleaning device 16 adapted chiefly for dusting of rust and the like and a second cleaning device 17 adapted chiefly for removing moisture and oil stains, and to a pulling device 20 to which a flexible liner tube 19 is connected, the cleaning device 18 being disposed forwardly of the pulling device 20. This arrangement, by operating a winch 21, permits the cleaning device 18 to pass through the pipe and the liner tube 19 to enter pipe 1 so as to extend over the whole length thereof. Though the first and second cleaning devices 16, 17 and the pulling device 20 are passed through the pipe 1 together in the arrangement of FIG. 3, it will be understood that they may be passed therethrough separately. That is to say, the first cleaning device 16 is first passed through the pipe, the second cleaning device 17 is passed after the passage of the first cleaning device 16, and lastly the pulling device 20 is passed. In this instance, the passage of the second cleaning device 17 may be caused by air pressure, without using winch 21. Such passage under air pressure produces the effect of driving peeled-off dust forwardly with the air pressure that escapes forwardly from the second cleaning device 17.

Figure 4A:
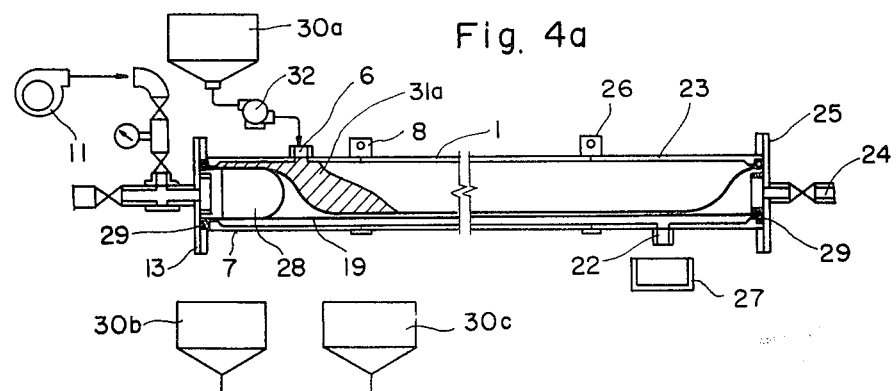
Figure 4B:
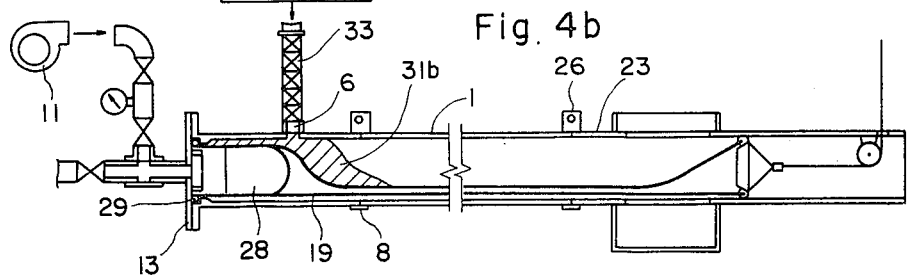
FIG. 4b is a diagrammatic view of another embodiment corresponding to the one shown in FIG. 4a, FIG. 5b is a diagrammatic view of another embodiment corresponding to the one shown in FIG. 5a, FIG. 8 is a perspective view of a radial expander means for treating a pipe end.

As shown in FIG. 4a, a receiver 23 having an outlet port 22 for the liquid adhesive agent is coupled to the other pipe opening by means of a band 26 which is of the same type as the band 8, and a lid member 25 having an air discharge part 24 is attached to the receiver 23. The arrangement includes a tank 27 for collecting any superfluous adhesive agent. An object 28 having a slightly smaller diameter than the pipe 1 is inserted in the tube 19. Both ends of the tube 19 are passed over rings 29 to be tucked in, and are held securely between the launcher 7 and lid member 13 and between the receiver 23 and lid member 25, respectively. The liquid adhesive agent 31a from a tank 30a is introduced in an amount necessary or more than necessary for adhesion between the upper surface of tube 19 and the upper inner surface of pipe 1 via the inlet port 6 by the action of a pump 32. Where the adhesive agent having two components is employed as illustrated in FIG. 4b, the liquids from two tanks 30b, 30c are arranged to meet near inlet port 6 and then proceed confluently to a static mixer 33 for mixing with one another, from which the adhesive agent is introduced immediately between the upper surface of tube 19 and the upper inner surface of pipe 1. Such arrangement will produce little superfluity of the adhesive agent 31b of the two mixed liquid components and require few cleansing members after the lining operation. As shown in the righthand side of FIG. 4b, the liquid adhesive agent 31a or 31b may be introduced, with the receiver 23 kept open, without the lid.

Figure 5A:
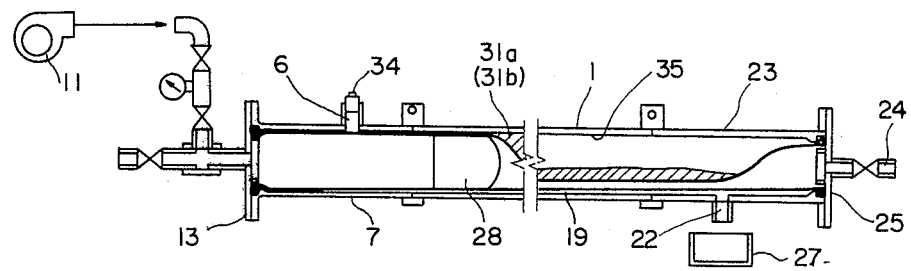
Figure 5B:
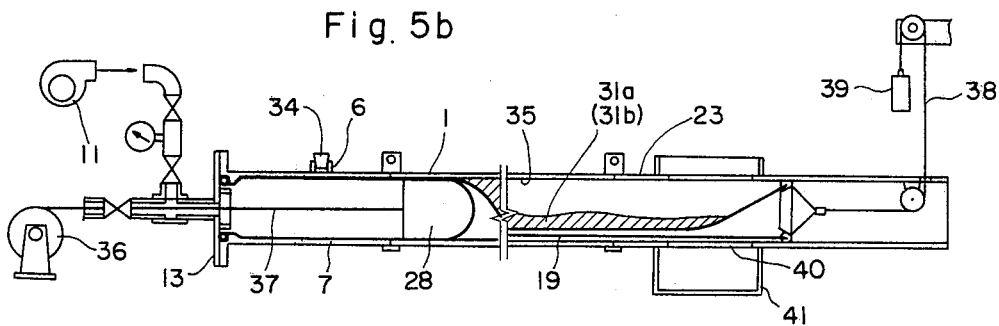

Referring now to FIG. 5a, the inlet port 6 for the adhesive agent is closed with a plug 34, and the object 28 is made to advance under pressure from the pressure device 11 toward the other pipe opening, radially expanding the tube 19 which has been in a shrunk condition and at the same time forwardly thrusting the adhesive agent 31a or 31b which has been introduced in front of object 28 and distributing it evenly over the entire periphery and length of the interior wall 35 of the pipe 1, whereby the tube 19 is made to adhere to the interior wall 35 of the pipe 1. It is particularly important to constantly retain the adhesive agent 31a or 31b substantially over the entire forward face of the object 28 during this operation. The various tests conducted by the inventors, as noted in the introductory part of this specification, prove that excellent adhesion takes place where the adhesive agent 31a or 31b used has a viscosity of 2,000 to 50,000 cp, preferably 5,000 to 30,000 cp, and the object 28 is driven at a speed of 1 to 30 cm/sec, preferably 2 to 20 cm/sec. A still better adhesion may be obtained by arranging that the object 28 is formed at least surfacially of a resilient material and has a diameter substantially equal to or slightly greater than that of the pipe 1, whereby the tube 19 is pressed against the interior wall 35 of the pipe 1. As shown in the lefthand side of FIG. 5b, the object 28 may trail a graduated string 37 wound on a reel 36, which has the advantage of indicating the travelling speed and the position of object 28. Further, as shown in the righthand side of FIG. 5b, the receiver 23 may have an opening and the end of the tube 19 may be pulled by means of a wire 38 engaged therewith and a weight 39. Such arrangement, compared with the arrangement of FIG. 5a, facilitates passage of object 28 and prevents the tube 19 from getting crumpled. This is of advantage particularly in the case of lining a large-diameter pipe 1 or in the lining operation covering a long distance. In FIG. 5b, reference number 40 indicates a large diameter outlet port for the adhesive agent 31a or 31b and reference number 41 indicates a tank for collecting superfluous adhesive agent.

Figure 6:
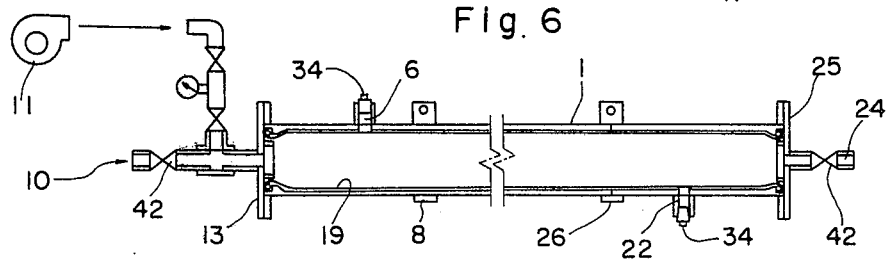

Referring to FIG. 6, the wire passage 10 and the air discharge part 24 are closed by valves 42, 42 and the inlet port 6 and the outlet port 22 for the adhesive agent are closed with plugs 34, 34, and then a pressure device 11 is actuated to apply pressure to the inside of the tube 19. Such state is maintained till the curing of the liquid adhesive agent 31a or 31b is complete or nearly so.

Figure 7:
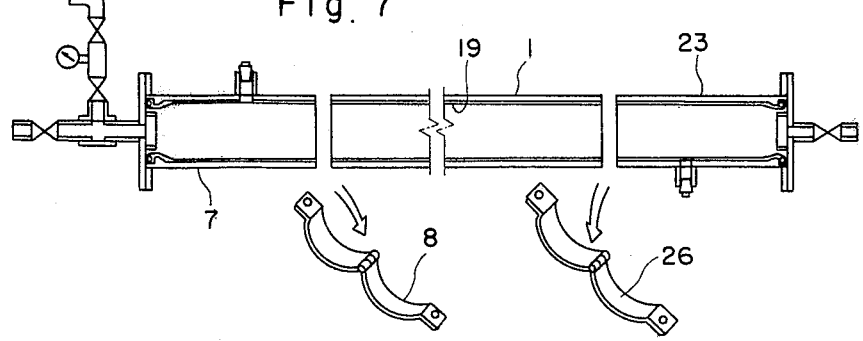
Figure 8:
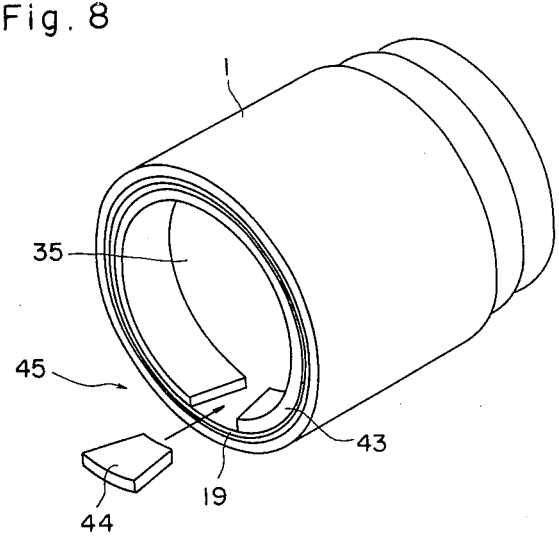
Figure 9:
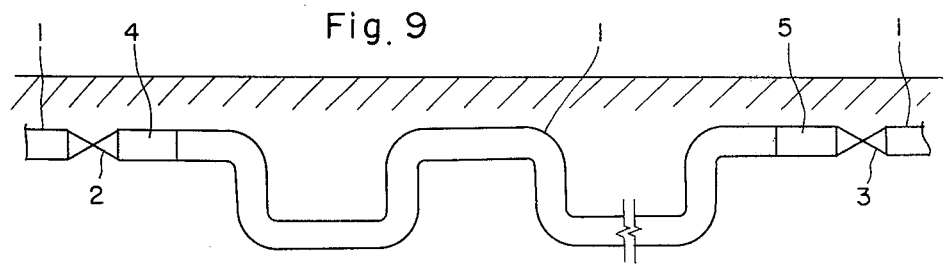

Referring to FIG. 7 next, bands 8, 26 are removed and the lining layer is cut at joints between pipe 1 and launcher 7 and between pipe 1 and receiver 23 to remove launcher 7 and receiver 23. Then, if necessary, the pipe ends may be treated by newly applying the adhesive agent thereto and by pressing the tube ends against the interior wall 35 of the pipe 1 by means of a radial expander means 45 comprising a ring 43 with a portion cut out in a tapering form and a wedge element 44 as shown in FIG. 8. The pipe ends may be treated before the adhesive agent cures completely. In other words, the pipe end treatment as illustrated in FIGS. 7 and 8 is carried out while the adhesive agent is uncured, and then follows a treatment under pressure similar to that illustrated in FIG. 6. Pressed against the interior wall 35 of the pipe 1 by the radial expander means 45 while the liquid adhesive agent 31a or 31b is uncured, the tube ends fit well on the interior wall 35 of the pipe 1. Thus, such process has an advantage of high efficiency of the operation including the work of making tube 19 adhere to the pipe 1.

Now the internal lining treatment of the installed pipe is complete, pipes 1, 1 are connected to one another by restoring the removed pipe portions 4, 5 or by means of specially provided pipes, and the valves 2, 3 are opened. The whole work completes with making up of the dug out spots.

Figure 10:
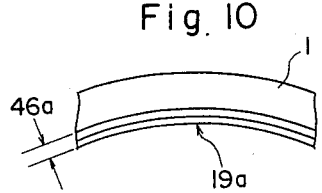
FIGS. 10 and 11 are each a sectional view showing details of lining layers.

The tube 19 is described next. FIG. 10 shows a tube 19a of single layer construction, which may be a layer of flexible film material, a laminate of film layers suitably placed one upon another, or a film layer reinforced with a mesh material and the like. As for the material for tube 19a, what is required of it is a certain degree of flexibility and strength, and particularly desirable are such various polymers as plastics including polyethylene, polyvinyl chloride, polypropylene, nylon, Teflon and so on, natural rubber, and synthetic rubbers including polybutadiene, SBR, NBR and so on. This tube 19a, together with the liquid adhesive agent 31a or 31b after having cured, forms a lining layer 46a.

Figure 11:
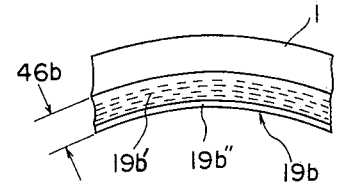

FIG. 11 shows a tube 19b of a flexible plural layer construction comprising a first tube member 19b' disposed exteriorly and having good permeability to the liquid adhesive agent 31a or 31b and a second tube member 19b" of a film material disposed interiorly. The use of tube 19b of plural layer construction has the various advantages set out in the introductory part of this specification, namely that a lining layer 46b of a considerable thickness may be formed by arranging the thickness of the first tube member 19b'.

Material for the first tube member 19b' may be selected from fibrous materials such as glass fiber, asbestos fiber, carbon fiber, synthetic fiber, animal and vegetable fibers, metal fiber, and from various synthetic resins and metals. Such material is given an increased permeability to the liquid adhesive agent 31a or 31b by processing it into an unwoven sheet form or a mesh form. The mesh form here means the above material processed into a texture having meshes per se such as a woven sheet, a knitting and textile, or the mesh texture further processed for finer meshes, a mesh structure of welded synthetic resin wires, or a porous film.

Material for the second tube member 19b" may be selected from a film layer of polymer having as the chief component polyethylene, polyvinyl chloride, polypropylene, nylon, teflon or the like, a film laminate formed by suitably placing the foregoing layers one upon another, or a film material reinforced with a mesh material and the like. A laminate film with an inner layer of polyethylene and an outer layer of nylon is particularly desirable for the lining treatment because the polyethylene to be exposed to fluid has an excellent chemical resistance and the nylon to be exposed to the adhesive agent 31a or 31b has an excellent wear resistance, tensile strength and adhesive quality.

Figure 12:
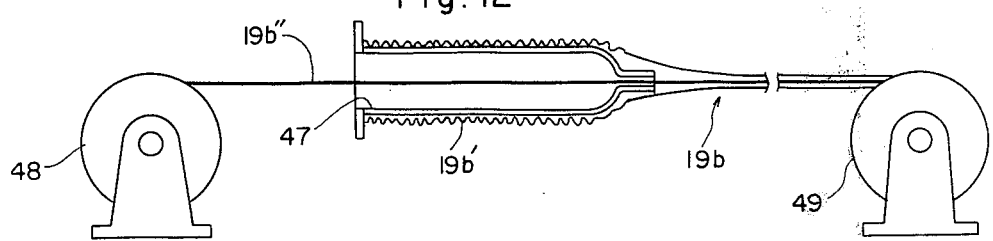
FIG. 12 is a diagrammatic view of a device for forming a plural layer tube.

FIG. 12 shows how the tube 19b of plural layer construction is formed. The first tube member 19b' in shrunk condition is shown fitted about a tubular element 47 having open ends, and the second tube member 19b" which has been wound on a reel 48 is inserted in the tubular element 47. Then the two tube members 19b', 19b" are drawn together away from the tubular element 47, one over the other, to be wound on a further reel 49. Alternatively, the introduction of the two tube members 19b', 19b" into the installed pipe 1 as shown in FIG. 3 may be made in parallel with the overlaying operation of the two tube members. Various advantages, such as improved efficiency, as described in the introductory part of this specification are derived from forming the first tube member 19b' and the second tube member 19b" into one piece prior to insertion into the pipe 1. While the two tube members may be bonded together in various ways such as by adhesive or by mechanical means, heat welding is preferable from the point of view of efficiency.

The tube 19b may be formed to have multiple layers by combining or bonding two or more first tube members 19b', 19b" of the same or different materials/compositions prior to superposing on the second tube member 19b". It is also possible to form the tube 19b with the second tube member 19b" in which a wire is pre-inserted. Such wire may be conveniently used to draw the object 28 along for radially expanding the tube 19b within the pipe 1.

After a lining layer 46b is set in place, another of the plural layer tube 19b or tube 19a of FIG. 10 may be introduced into the pipe 1, then the liquid adhesive agent 31a or 31b is delivered between the tube 19b or 19a and the lining layer 46b, and the object 28 for radial expansion is passed inside the tube 19b or 19a, so that the tube 19b or 19a is made to adhere to the inner face of the lining layer 46b by the action of the adhesive agent 31a or 31b. By repeating this process, the pipe 1 may be internally coated with a thick, strong resinous multi-layer lining having a uniform thickness.

The liquid adhesive agent 31a or 31b may be a resinous substance such as a urethane, epoxy, polyester, acrylic, silicone or polysulfide resin, and its property may be varied, namely heat curable, curable at room temperature, anaerobiotically curable or moisture curable.

What we claim is:

1. A method of installing an internal-lining in a cleaned and prepared installed pipe surface including an upper portion and a lower portion, comprising the steps of;
   (a) placing a flexible liner tube having an outer and an interior surface in said pipe along its lower portion with said liner tube extending the length of said pipe,
   (b) introducing a selected quantity of liquid adhesive agent into one end portion of said pipe between a portion of said upper portion of the inner surface of said pipe and a portion of the upper portion of the outer surface of said liner tube, in a sufficient amount to secure the entire length of said flexible liner to said inner surface of said liner pipe,
   (c) passing an object having a cross-sectional diameter substantially the same as that of said inner surface of said pipe through the interior of said liner tube from said one end portion in a direction to thereby distribute said introduced liquid adhesive agent evenly and positively in the peripheral and longitudinal directions along said inner surface of said pipe and along the outer surface of said flexible liner as said object passes through said liner tube thereby causing said liner tube to expand into overlying engagement with the inner surface of said pipe and to adhere thereto.

2. A method as claimed in claim 1 wherein said adhesive agent has a viscosity of 2,000 to 50,000 cp, and said object passes at a velocity of 1 to 30 cm/sec. thereby to constantly retain said adhesive agent forwardly of said object.

3. A method as claimed in claim 2 wherein said adhesive agent has a viscosity of 5,000 to 30,000 cp and said object passes at a velocity of 2 to 20 cm/sec.

4. A method as claimed in claim 3 wherein said liner tube has a multi-layer construction comprising an outer first tube member and an inner second tube member, said first tube member being formed of a material having high permeability to the liquid adhesive agent and the second tube member being formed of a film of lining material, said first tube member being formed of at least one of an unwoven and a mesh synthetic resin material and said second tube member is formed of polymeric film.

5. A method as claimed in claim 4 wherein said first and second tube members are formed into a single piece by adhesion process prior to insertion into the pipe.

6. A method of internally lining an installed pipe having an inner surface including an upper portion and lower portion, comprising the step of;
   placing a flexible liner tube in the pipe along its lower portion with said liner tube extending between the ends of said pipe, introducing a selected quantity of a liquid adhesive agent into one end of the pipe between a portion of the upper portion of the inner wall of the pipe and a portion of the upper portion of the surface of said liner tube, and passing a resilient object of a slightly greater diameter than said pipe through the interior of said liner tube from said one end in which said adhesive agent is introduced to the other end of said pipe thereby expanding said liner tube into overlying engagement with the inner wall of said pipe and simultaneously distributing the adhesive agent peripherally and longitudinally of the inner wall of said pipe to thereby cause said liner tube to adhere to the inner wall of said pipe, said liner tube having a multi-layer construction comprising an outer first tube member and an inner second tube member, said first tube member being formed of a material having high permeability to the liquid adhesive agent and the second tube member being formed of a film of lining material, said first tube member being formed of at least one of an unwoven and a mesh synthetic resin material and said second tube member is formed of polymeric film, said polymeric film comprising a laminate film including a plurality of polymeric films placed one upon another.

7. A method as claimed in claim 6 wherein said liner tube has a multi-layer construction comprising an outer first tube member and an inner second tube member, said first tube member being formed of a material having high permeability to the liquid adhesive agent and the second tube member being formed of a film of lining material.

8. A method as claimed in claim 7 wherein said first tube member is formed of at least one of an unwoven and a mesh synthetic resin material and said second tube member is formed of polymeric film.

9. A method as claimed in claim 1 including the steps of:

clamping a cylindrical launcher to said one end of said pipe, extending said flexible liner from said launcher through said pipe along its entire length, introducing the liquid adhesive agent into said launcher between its inner surface and said liner, and passing said object from said launcher through said liner.

* * * * *